(12) United States Patent
Kim

(10) Patent No.: US 7,144,007 B2
(45) Date of Patent: Dec. 5, 2006

(54) PAPER SIZE RECOGNIZING DEVICE FOR IMAGE FORMING APPARATUS

(75) Inventor: Kyung-Hwan Kim, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1145 days.

(21) Appl. No.: 09/973,074

(22) Filed: Oct. 10, 2001

(65) Prior Publication Data
US 2002/0085242 A1    Jul. 4, 2002

(30) Foreign Application Priority Data
Dec. 29, 2000    (KR) ............................... 2000-86387

(51) Int. Cl.
*B65H 1/00*    (2006.01)
(52) U.S. Cl. .................................... 271/171
(58) Field of Classification Search ................ 271/171, 271/162; 399/389, 393; 347/104
See application file for complete search history.

(56) References Cited

U.S. PATENT DOCUMENTS 4,871,085 A * 10/1989 Graef et al. .................... 221/4
5,655,764 A * 8/1997 Ota et al. .................... 271/171
5,676,370 A * 10/1997 Taniguchi et al. ..... 271/265.02
6,254,085 B1 * 7/2001 Kang .......................... 271/171

FOREIGN PATENT DOCUMENTS

JP          5-278866 A    * 10/1993

* cited by examiner

*Primary Examiner*—David H. Bollinger
(74) *Attorney, Agent, or Firm*—Robert E. Bushnell, Esq.

(57) ABSTRACT

A paper size recognizing device includes paper-aligning guides linear-reciprocally mounted to closely align the paper loaded in the cassette in one direction, a signal-generating unit interlocked with the paper-aligning guides, for generating plural signal codes selectively combined in predetermined patterns, switching unit mounted in the main body to be selectively operated in response to the signal codes generated by the signal-generated unit upon loading the cassette; and controller for outputting as an electrical signal paper size information on the paper loaded in a cassette through signal information inputted by operations of the switching unit, whereby the paper size information on the paper held in the container can be automatically recognized and provided in real-time upon loading the paper cassette.

71 Claims, 4 Drawing Sheets

| | | | | |
|---|---|---|---|---|
| ISO A3 | ☒ | ☒ | | ☒ |
| Ledger | ☒ | ☒ | | |
| JIS B4 | ☒ | | ☒ | |
| ISO A5L | | | | |
| Folio | ☒ | | | ☒ |
| Statement L | | | | ☒ |
| JIS B5L | | | ☒ | |
| Legal | ☒ | | ☒ | |
| Letter L | | ☒ | | |
| JIS B4 | ☒ | ☒ | ☒ | |
| Letter | | ☒ | ☒ | |
| ISO A4L | | ☒ | | ☒ |
| Executive L | | | ☒ | ☒ |
| Executive | | ☒ | | |
| ISO A4 | ☒ | | | |
| NO CASSETTE | ☒ | ☒ | ☒ | ☒ |

☒ OFF (SIGNAL OPENING CLOSED)

☐ ON (SIGNAL OPENING OPEN)

PAPER SIZE RECOGNIZING DEVICE FOR IMAGE FORMING APPARATUS

CLAIM OF PRIORITY

This application makes reference to, incorporates the same herein, and claims all benefits accruing under 35 U.S.C. §119 from my application PAPER SIZE RECOGNIZING DEVICE FOR IMAGE FORMING APPARATUS filed with the Korean Industrial Property Office on 29 Dec. 2000 and there duly assigned Serial No. 86387/2000.

BACKGROUND OF THE INVENTION

1. Technical Field

The present invention relates to a paper size recognizing device for recognizing a size of paper and more particularly, relates to a paper size recognizing device capable of automatically recognizing a variety of standardized and non-standardized paper sizes upon loading of a paper cassette.

2. Related Art

An image forming apparatus such as a laser printer, a photocopier, and so on has a removable cassette holding a plurality of sheets of printing paper to be stacked. In an image forming apparatus, a user recognizes information in advance based on the size of the paper stacked in the cassette and inputs the information through a control panel of the image forming apparatus. For example, in many cases, cassettes which exclusively accommodate standardized paper defined in A4, B4, and so on, are mounted in the main body of the image forming apparatus, and paper is drawn for use out of a cassette designated based on inputted control signals.

Further, in many cases, a user manipulates an operation button disposed on a printer front panel and the like in order for the paper of desired size to be supplied from a corresponding cassette, or physically mounts the corresponding cassette, or changes the mounting position of the cassette.

Accordingly, since the user of the existing image forming apparatus has to designate a desired size in order to use the paper of desired size, it causes an inconvenience, and, particularly, since the paper of non-standardized size is not recognized quite often, using the paper itself can be difficult.

SUMMARY OF THE INVENTION

The present invention has been devised to solve the problems of a paper size recognizing device for an image forming apparatus as stated above. It is an object of the present invention to provide a paper size recognizing apparatus for an image forming apparatus, capable of automatically recognizing and providing in real-time information on standardized and non-standardized diverse paper sizes upon loading cassettes.

In order to achieve the above object and others, a paper size recognizing device for an image forming apparatus according to the present invention, in a paper size recognizing device for an image forming apparatus having a paper size recognizing unit for recognizing a size of sheets of paper loaded in a cassette detachably mounted in a main body of the image forming apparatus, comprises the paper size recognizing unit including: paper-aligning guides linear-reciprocally mounted to closely align the sheets of paper loaded in the cassette in one direction; signal-generating unit interlocked with the paper-aligning guides, and for generating plural signal codes selectively combined in predetermined patterns; switching unit mounted in the main body to be selectively operated in response to the signal codes generated by the signal-generated unit upon mounting the cassette; and controller for outputting as an electrical signal paper size information through signal information inputted by operations of the switching unit.

According to the present invention having the above structure, the signal-generating unit preferably includes plural fixed signal openings formed to be arranged in a predetermined pattern in a side wall of the cassette; a signal-producing panel for producing plural signal codes selected in any one of patterns by plural combinations arranged in a state that plural movable signal openings formed in a body by reciprocating along the side wall of the cassette in association with the paper-aligning guides communicate with the fixed signal openings respectively; and interlocking unit for mutually interlocking the page-aligning guides and the signal-producing panels.

Further, the switching unit is movably mounted in the main body forwards and backwards according to attaching and detaching directions of the cassette, and preferably includes plural slide pins selectively moving forwards and backwards by being interfered by a signal code produced by the signal-generating unit upon mounting the cassette and photo sensors as a sensing unit for sensing the forward and backward movements of each slide pin.

Furthermore, in order to achieve the above object and others, another paper size recognizing device for an image forming apparatus, in a paper size recognizing device for an image forming apparatus having a paper size recognizing unit for recognizing a size of sheets of paper loaded in a cassette detachably mounted in a main body of the image forming apparatus, comprises the paper size recognizing unit including a longitudinal paper-aligning guide and a lateral paper-aligning guide paper-aligning guides linear-reciprocally mounted in a direction perpendicular to each other to closely align the sheets of paper loaded in the cassette in longitudinal and lateral direction; signal-generating unit interlocked with the longitudinal and lateral paper-aligning guides, and for generating plural signal codes selectively combined in predetermined patterns; switching unit mounted in the main body to be selectively operated in response to the signal codes generated by the signal-generated unit upon mounting the cassette; and controller for outputting as an electrical signal paper size information through signal information inputted by operations of the switching unit.

According to the present invention having the above structure, the switching unit is movably mounted in the main body forwards and backwards according to attaching and detaching directions of the cassette, and includes plural slide pins selectively moving forwards and backwards by being interfered by a signal code produced by the signal-generating unit upon mounting the cassette and contact switches correspondingly mounted around end portions of the slide pins and selectively and electrically contacted according to whether the end portions move forwards or backwards.

To achieve these and other objects in accordance with the principles of the present invention, as embodied and broadly described, the present invention provides an apparatus recognizing a size of media, said apparatus comprising: a media aligning guide being mounted on a cassette and being movable to a plurality of different positions to align media loaded in the cassette, the cassette being detachably mounted in a main body; a signal generating unit being interlocked with said media aligning guide, said signal generating unit generating a plurality of signal codes in response to a current position of said media aligning guide;

a switching unit being mounted on the main body, said switching unit switching in response to the generated signal codes when the cassette is mounted in the main body; and a control unit outputting a size signal in response to said switching of said switching unit, said size signal corresponding to a size of the media loaded into the cassette.

To achieve these and other objects in accordance with the principles of the present invention, as embodied and broadly described, the present invention provides an apparatus recognizing a size of media, said apparatus comprising: a first media aligning guide being mounted on a cassette and being reciprocally movable to a plurality of different positions along a first line in a first direction to closely align the media loaded in the cassette, the cassette being detachably mounted in a main body; a second media aligning guide being mounted on the cassette and being reciprocally movable to a plurality of different positions along a second line in a second direction to closely align the media loaded in the cassette, said first direction being substantially perpendicular to said second direction; a signal generating unit being interlocked with said first and second media aligning guides, said signal generating unit generating a plurality of signal codes in response to a current position of said first and second media aligning guides; a switching unit being mounted on the main body, said switching unit switching in response to the generated signal codes when the cassette is mounted in the main body; and a control unit outputting a size signal in response to said switching of said switching unit, said size signal corresponding to a size of the media loaded into the cassette.

To achieve these and other objects in accordance with the principles of the present invention, as embodied and broadly described, the present invention provides an apparatus recognizing a size of media, said apparatus comprising: a first media aligning guide being mounted on a cassette and being reciprocally movable to a plurality of different positions along a first line in a first direction to closely align media loaded in the cassette, the cassette being detachably mounted in a main body; a second media aligning guide being mounted on the cassette and being reciprocally movable to a plurality of different positions along a second line in a second direction to closely align the media loaded in the cassette, said first direction being substantially perpendicular to said second direction; a signal generating unit being interlocked with said first and second media aligning guides, said signal generating unit generating a plurality of signal codes in response to a current position of said first and second media aligning guides, said plurality of signal codes having combinations respectively corresponding to sizes of media; a switching unit switching in response to the generated signal codes when the cassette is mounted in the main body; and a control unit outputting a size signal in response to said switching of said switching unit, said size signal corresponding to a size of the media loaded into the cassette, said first and second media aligning guides being moved in response to touching edges of the media when the media is loaded into the cassette, said first and second media aligning guides having a current position corresponding to the size of the media when the media is loaded into the cassette.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENT

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. In the following description, well-known functions or constructions are not described in detail since they would obscure the invention in unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Figure 1:
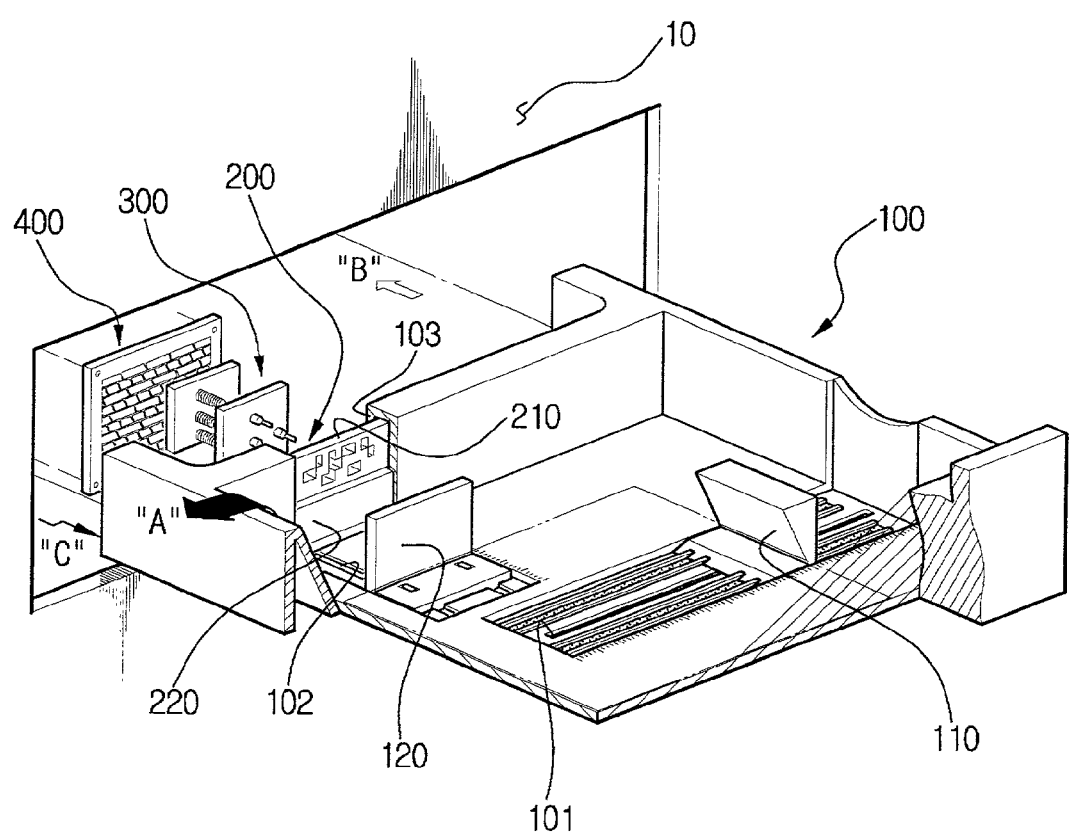
FIG. 1 is a partially cross-sectioned exploded perspective view for schematically showing a paper size recognizing device for an image forming apparatus and the top side of a cassette, in accordance with the principles of the present invention.

Hereinafter, a paper size recognizing device for an image forming apparatus according do to a preferred embodiment of the present invention will be described in detail with reference to the accompanying drawings. As shown in FIG. 1, a paper size recognizing device for an image forming apparatus according to an embodiment of the present invention comprises a paper cassette 100 detachably mounted in a direction (arrow 'B') perpendicular to a paper-feeding direction (arrow 'A') with respect to a main body 10 of an image forming apparatus, a pair of paper-aligning guides 110 and 120 linearly and reciprocally movable on the bottom of the cassette in directions orthogonal to each other, a signal-generating unit 200 associated with the paper-aligning guides 110 and 120 and for generating plural signal codes selectively combined in certain patterns, a switching unit 300 mounted in the main body 10 to be selectively operated in response to the signal codes generated by the signal-generating unit 200 upon the loading of the cassette 100, and a control unit 400 for outputting electrical signal information on a paper size of sheets of paper stacked in the cassette 10 through the signal information inputted by the operations of the switching unit 300. The paper-aligning guide 110 can abut the edge of the paper in the cassette 100 to align the paper in the cassette 100. The arrow 'A' indicates a direction in which paper is fed from the cassette 100 seriatim, when the paper is automatically fed into the image forming device for printing.

In this description of the present invention, sheets of paper are described as being placed in cassette 100, and then the size of the sheets of the paper is automatically recognized by the present invention. Paper is one example of a recordable media. In addition, the present invention can detect the size of media other than paper. For example, recordable media such as plastic transparencies and other media can be used in lieu of paper with the present invention. The present invention can also be used with sheets of adhesive labels, perforated sheets of business cards, and other media. For example, when sheets of plastic transparencies are placed in cassette 100, then the size of the sheets of transparencies is recognized by the present invention, in accordance with the principles of the present invention.

The paper-aligning guides 110 and 120 are a longitudinal paper-aligning guide and a lateral paper-aligning guide, respectively, for closely aligning the sheets of paper loaded in the cassette 100 in the width direction and in the length direction, which are slidably connected in guide grooves 101 and 102 formed on the bottom of the cassette 100 and in directions perpendicular to each other and independently move to each other.

Accordingly, the longitudinal and lateral paper-aligning guides 110 and 120, for example, guide various types of paper of standardized and non-standardized sizes such as sheets of paper having the same length but having different widths or having the same width but having different lengths and closely contact the paper, to thereby align the sheets of paper in an orderly loaded state.

Figure 2:
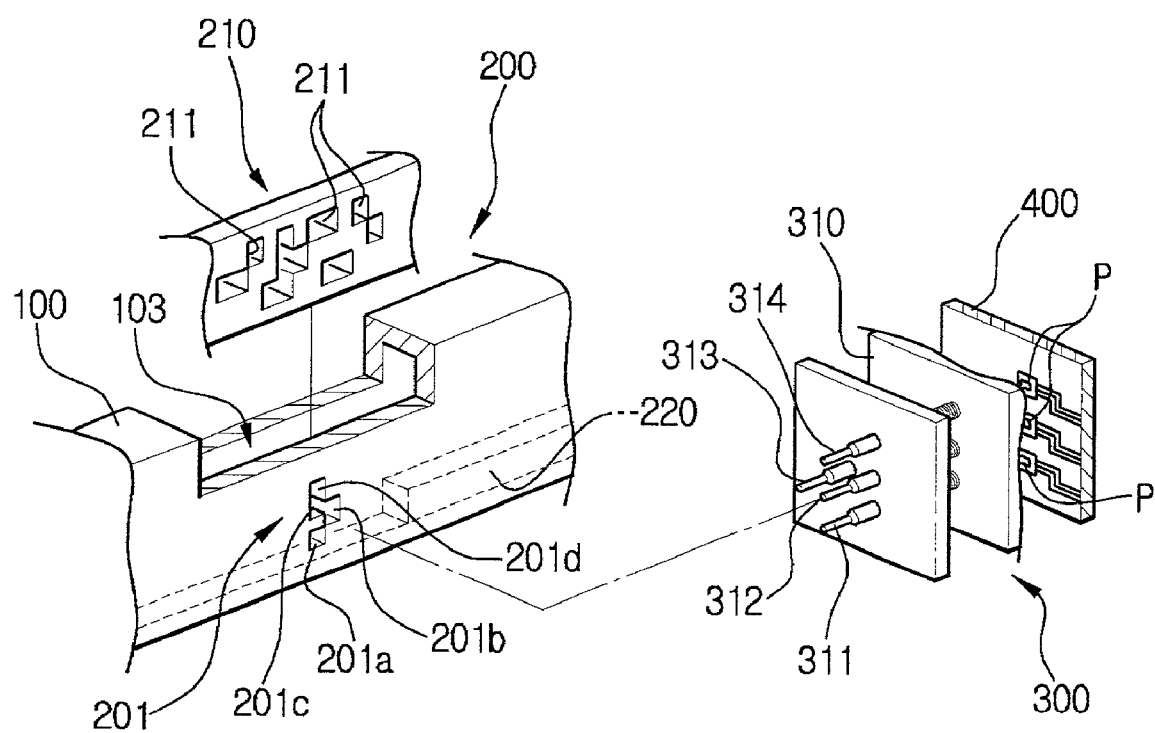
FIG. 2 is an exploded perspective view for showing main parts of FIG. 1 taken in the direction of an arrow 'C', in accordance with the principles of the present invention.

The signal-generating part 200, as shown in FIG. 2, includes a plurality of fixed signal openings 201 formed in a region of a side wall of the cassette 100 to be arranged in a certain pattern, and signal-producing panel 210 and a slide member 220 associated with each of the longitudinal and lateral paper-aligning guides 110 and 120 and for individually and selectively opening and closing the fixed signal openings 201. The fixed signal openings 201 can also be described as apertures or orifices.

The signal-producing panel 210 and the slide member 220, as shown, are accommodated in a state arranged side by side one on another in a slide accommodation space part 103 equipped in the side wall of the cassette 100, and linearly reciprocates along the slide accommodation space part 103 in association with each of the longitudinal paper-aligning guide 110 and lateral paper-aligning guide 120 by a predetermined interlock unit.

Figure 3:
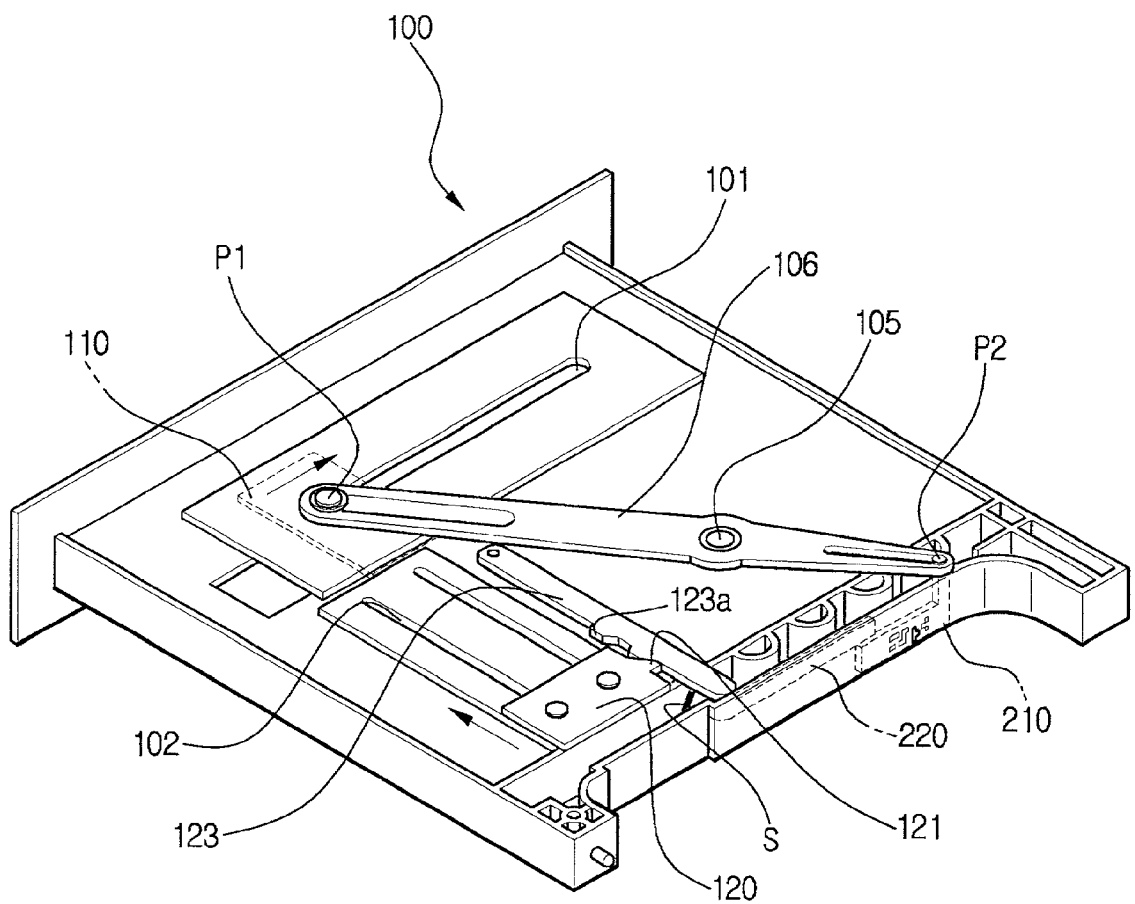
FIG. 3 is a schematic perspective view for showing the bottom side of the cassette of FIG. 1, in accordance with the principles of the present invention.

According to the present invention, the interlock unit, as shown in FIG. 3, includes a first interlock unit for associating the longitudinal paper-aligning guide 110 with the signal-producing panel 210, and a second interlock unit for associating the lateral paper-aligning guide 120 with the slide member 220.

As shown in FIG. 3, the first interlock unit includes an arm member 106 freely rotated by a rotating shaft 105 mounted on the bottom of the cassette 100. Both ends of the arm member 106 are rotatably connected to the bottom of the longitudinal paper-aligning guide 110 and the bottom of the signal-producing panel 210 respectively by connection pins P1 and P2.

Accordingly, the arm member 106 is in rotating movements according to the linearly reciprocating movements of the longitudinal paper-aligning guide 110 in association with the signal-producing panel 210, to thereby have the signal-producing panel 210 perform linearly reciprocating movements.

Further, the second interlock unit includes a cam protrusion 121 protruded from the lower side of the lateral paper-aligning guide 120, and a rotating member 123 formed on the bottom of the cassette 100 in order to interfere with the cam protrusion 121 for rotation.

The rotating member 123 has a cam curve portion 123a along which a cam follows through complementary operations with the cam protrusion 121, and is mounted to be elastically biased in one direction by a spring 's' mounted in the cassette 100.

Accordingly, the rotating member 123 linearly reciprocates the slide member 220 associated thereto by rotating a free end thereof according to the linear reciprocating movements of the lateral paper-aligning guide 120.

The fixed signal openings 201 and movable signal openings 211 are each adjacently arranged with unit signal openings of the same standard in a multi-stepped manner to form a predetermined pattern on a horizontal reference line, forming to be combined in a way capable of opening and closing each other. The movable signal openings 211 can also be described as apertures or orifices. Each one of the fixed signal openings 201 and the movable signal openings 211 can have a uniform unit height, such that at least more than three units of the uniform unit height are arranged from top to bottom.

According to one embodiment of the present invention, the fixed signal openings 201, as shown in FIG. 2, are preferably formed to be arranged in four steps with a first fixed signal opening 201a formed in a lower portion of the side wall of the cassette 100, a second fixed signal opening 201b formed to be adjoined in an upper diagonal direction of the first fixed signal opening 201a, a third fixed signal opening 201c formed to be adjoined in an upper diagonal direction of the second fixed opening 201b and to be placed above the first fixed signal opening 201a and spaced apart from the first fixed signal opening 201a, and a fourth fixed signal opening 201d formed to communicate in the straight upper direction of the third fixed signal opening 201c.

Further, the movable signal openings 211, as shown, are arranged to be combined with multiple openings corresponding to each of the second to fourth fixed signal openings 201b to 201d, to produce plural signal codes corresponding to various paper sizes.

With the above structure, the signal-producing panel 210 is restrained by the arm member 106 according the movements of the longitudinal paper-aligning guide 110 and interlockingly moves along the slide accommodation space part 103 in the side wall of the cassette 100. Accordingly, the plural movable signal openings 211 formed in the body of the signal-producing panel 210 produces plural signal codes selected in any one of patterns based on plural combinations arranged in a state of individually communicating, opening, and closing with respect to the second through fourth fixed signal openings 201b through 201d formed in the side wall of the cassette 100.

The second slide member 220 is restrained by the rotating member 123 according to the movements of the lateral paper-aligning guide 120 to interlockingly move along the slide accommodation space part 103 of the side wall of the cassette 100. Accordingly, the first fixed signal opening 201a is selectively opened and closed to additionally produce a separate signal code by a combination with a signal code produced according to the movements of the signal-producing panel 210.

According to one aspect of the present invention, the switching unit 300, as shown in FIG. 2, includes plural slide pins 311, 312, 313, and 314 mounted on a bracket 310 supported on the main body 10 of the image forming apparatus to move forward and backward with an interference by a signal code produced by a combination state that the fixed signal openings 201 and the movable signal openings 211 communicate by means of the signal-generating part 200 upon loading the cassette 100, and photo sensors P are mounted on a rear end side of the slide pins 311 to 314 to correspond to the respective slide pins 311 to 314 to detect whether the respective slide pins 311 to 314 move forward or backward, and to output the detection information to a controller 400.

The slide pins 311 to 314, as shown, include a first slide pin 311, a second slide pin 312, a third slide pin 313, and a fourth slide pin 314 positioned to correspond to the respective first through fourth fixed signal openings 201a through 201d formed in the sidewall of the cassette 100.

The first fixed signal opening 201a is an aperture formed in the wall of the cassette 100. The slide pin 311 can penetrate the first fixed signal aperture 201a only when at least one of the movable signal openings 211 in the movable panel 210 is aligned with the aperture 210a. When one of the movable signal openings 211 or movable signal apertures 211 is aligned with the aperture 201a, a through-hole is formed. The slide pin 311 penetrates the formed through-hole and then the switching unit 300 detects that the through-hole was formed at aperture 201a.

Figure 4:
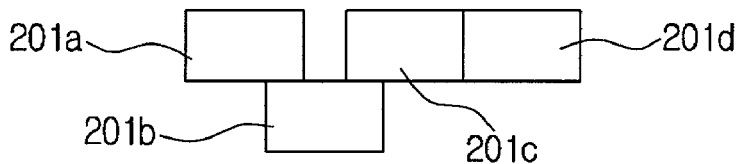
FIG. 4 is a view for showing an example of unique signal codes generated by paper size produced by the paper size recognizing device for an image forming apparatus, in accordance with the principles of the present invention.

A first combination of through-holes and blocked holes is formed when one or more apertures of the fixed apertures 201a and movable apertures 211 are aligned or not aligned. This first combination can be referred to as a size pattern. A second combination of through-holes is formed when one or more apertures of the fixed apertures 201 is blocked or not blocked by the slide member 220. This second combination can be referred to as a size code. The size pattern and size code can enable the present invention to be flexible and to be more useful due to adaptability. In other words, the first combination can be formed by the interaction of the panel 210 moving in relation to the fixed openings 201, with particular through-holes being formed and being blocked due to that interaction of the panel 210 and the fixed openings 201. The second combination can be formed by the interaction of the slide member 220 moving in relation to the fixed openings 201, with particular through-holes being formed or blocked due to that interaction of the slide member 220 and the fixed openings 201. FIG. 4 shows one possible example of a table of unique signal codes including size patterns and size codes.

In the meantime, according to another aspect of the present invention, as a device for detecting the forward and backward movements of the slide pins 311 through 314, contact switches electrically contacted with the slide pins 311 to 314 linearly moved may replace the photo sensors P.

The photo sensors and the contact switches, for example, are mounted to be electrically connected with a circuit board installed to be connected with the controller.

In the paper size recognizing device of an image forming apparatus according to the present invention, not only the longitudinal paper-aligning guide 110 and the lateral paper-aligning guide 120 move to be arranged to a size of the paper loaded in the cassette 100, but the information on the paper size can be produced as a unique signal code, so that the information on the size of the paper loaded in the cassette 100 can be detected when the cassette 100 is loaded in the main body 10 of the image forming apparatus.

Hereinafter, an operation process of the paper size recognizing device for the image forming apparatus according to the present invention as stated above will be described in detail.

First of all, if a user loads sheets of paper in the cassette 100 and moves the longitudinal paper-aligning guide 110 and the lateral paper-aligning guide 120 to be closely aligned to the sheets of paper, the signal-producing panel 210 and the second slide member 220 are interlocked to the respectively determined setting positions thereof.

According to this, a communicating state formed through a combination of the second through fourth fixed signal openings 201b through 201d formed in the wall of the cassette 100 and the plural movable signal openings 211 formed in the signal-producing panel 210, and opened/closed (on/off) states of the first fixed signal opening 201a formed in the wall of the cassette 100 by means of the slide member 220, are combined to each other, forming a communicating openings arranged in a particular pattern that produces a unique signal code for defining a size of the paper loaded in the cassette 100.

FIG. 4 is a plan view for showing in detail a signal code system for paper sizes produced in correspondence to the number of cases for combinations of the first to fourth fixed signal openings 201a to 201d and the movable signal opening 211 in accordance with the preferred embodiment of the present invention.

As shown in FIG. 4, for the paper size A3 as an example, a signal code is produced in which each of the first fixed signal opening 201a, the second fixed signal opening 201b, and the fourth fixed signal opening 201d is in a closed state (off) by the body of the signal-producing panel 210 and the third fixed signal opening 201c is in an open state (on) in communication with a particular movable signal opening 211 of the signal-producing panel 210.

Further, for the paper size B4 as an example, a signal code is provided in which each of the first fixed signal opening 201a and the third fixed signal opening 201c is in a closed state (off) by the body of the signal-producing panel 210 and the second fixed signal opening 201b and the fourth fixed signal opening 201d is in an open state (on) in communication with a particular movable signal opening 211 of the signal-producing panel 210.

The signal codes as stated above are only examples, and unique signal codes for paper sizes may be defined as various forms upon initial settings, and, particularly, for example, even unique signal codes for particular paper sizes such as standard envelopes, post cards, and so on may be defined as above, to thereby enable such particular paper sizes to be recognized.

Accordingly, with the paper size recognizing device for an image forming apparatus, in case that the cassette 100 of producing a signal code with respect to the information on a page size as stated above is loaded in the main body 10 of an image forming apparatus, it is determined whether each of the slide pins 311 to 314 performs linear movements according to an arranged shape of communicated openings based on the signal code. That is, slide pins mounted in positions corresponding to on-state fixed signal openings out of the first through fourth fixed signal openings 201a through 201d penetrate into the on-state communicating openings to maintain the initially set positions and posture even though the cassette 100 is loaded, and slide pins mounted in positions corresponding to off-state fixed signal openings out of the first through fourth fixed signal openings 201a through 201d are pressed by off-state communicating openings to perform linear movements upon loading the cassette 100. At this time, the photo sensors P detect the linear movements of the respective slide pins 311 to 314 and transmit a signal to the controller 400, so that the controller 400 outputs as a signal the information on a size of the paper loaded in the cassette 100 for a display.

In the paper size recognizing device for an image forming apparatus according to the present invention, the number and arrangement pattern of the fixed signal openings 201 formed in the sidewall of the cassette 100 and the movable signal openings 211 formed in the signal-producing panel 210 is not limited to the above embodiment but may change in various forms of embodiments. Further, a paper size corresponding to the on/off state of the fixed signal openings 201 and the movable signal openings 211 can be defined by changing in various forms upon initial setting.

As stated above, with the paper size recognizing device of an image forming apparatus according to the present invention, an effect is obtained that the paper size can be automatically recognized and the information thereof is provided in real time upon loading a cassette that holds paper of various sizes, from usual standard paper sizes to particular standard informal paper sizes such as envelopes, post cards, and so on.

The foregoing paragraphs describe the details of a paper size recognizing device for recognizing a size of paper loaded on a cassette of an image forming apparatus such as a laser printer and, more particularly, describe the details of a paper size recognizing apparatus for an image forming apparatus, capable of automatically recognizing and providing in real-time information on diverse standardized or non-standardized paper sizes upon loading a cassette.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus recognizing a size of media, said apparatus comprising:
    a media aligning guide being mounted on a cassette and being movable to a plurality of different positions to align media loaded in the cassette, the cassette being detachably mounted in a main body;
    a signal generating unit being interlocked with said media aligning guide, said signal generating unit generating a signal code in response to a current position of said media aligning guide, said signal generating unit including a panel movable with respect to a wall of the cassette, the panel having a plurality of signal apertures of the panel arranged in a predetermined pattern;
    a switching unit being mounted on the main body, said switching unit switching in response to the generated signal code when the cassette is mounted in the main body; and
    a control unit outputting a size signal in response to said switching of said switching unit, said size signal corresponding to a size of the media loaded into the cassette.

2. The apparatus of claim 1, said signal generating unit further comprising:
    a region of the wall of the cassette being adjacent to said panel, said region having a plurality of signal apertures of the region arranged in a pattern distinguishable from said predetermined pattern, said signal apertures of the panel and the region of the wall producing said signal code.

3. The apparatus of claim 2, said panel being connected to said media aligning guide and moving in response to movement of said media aligning guide.

4. The apparatus of claim 3,
    said signal code being formed by said signal apertures of the panel together with said signal apertures of the region in response to said panel moving in response to movement of said media aligning guide, said signal code corresponding to the size of the media loaded in the cassette, said plurality of signal apertures of the panel including at least a first aperture and a second aperture, said plurality of signal apertures of the region including at least a first aperture and a second aperture, said formed signal code comprising:
    at least said first apertures of said pluralities of signal apertures of the panel and region being aligned with each other and being not blocked and forming a through-hole through the wall of the cassette and through said panel when the cassette is mounted in the main body;
    at least said second aperture of said plurality of signal apertures of the panel being blocked by the wall of the cassette when the cassette is mounted in the main body; and
    at least said second aperture of said plurality of signal apertures of the region being blocked by said panel when the cassette is mounted in the main body.

5. The apparatus of claim 4, said switching unit further comprising:
    a plurality of slide pins selectively moving forward and backward according to an interference with said signal code generated by said signal generating unit when the cassette is mounted in the main body; and
    a sensing unit sensing forward and backward movements of each of said slide pins, at least one of said slide pins penetrating the through-hole formed by said first apertures of said pluralities of signal apertures of the panel and the region when the cassette is mounted in the main body.

6. The apparatus of claim 1,
    said panel being connected to said media aligning guide and moving in response to movement of said media aligning guide, and said signal code being formed by said signal apertures of the panel in response to said moving of said panel, said signal code corresponding to the size of the media loaded in the cassette.

7. The apparatus of claim 1, the main body corresponding to a main body of an image forming unit.

8. The apparatus of claim 1, the media corresponding to recordable media.

9. The apparatus of claim 1, said media aligning guide comprising:
a first guide aligning the media in a first direction; and
a second guide aligning the media in a second direction substantially perpendicular to said first direction.

10. The apparatus of claim 1, said media aligning guide being mounted in connection with at least one guide groove formed in bottom of the cassette, said media aligning guide being moved in linear reciprocating movements along said at least one guide groove.

11. The apparatus of claim 1, said switching unit being movably mounted in the main body, said switching unit moving backward being pressed by the cassette when the cassette is mounted in the main body, said switching unit moving forward being released from the cassette when the cassette is removed from the main body.

12. The apparatus of claim 1, said signal code having predetermined code combinations respectively corresponding to predetermined sizes of media.

13. The apparatus of claim 1, said switching unit further comprising:
a plurality of slide pins selectively moving forward and backward according to an interference with said signal code generated by said signal generating unit when the cassette is mounted in the main body; and
a sensing unit sensing forward and backward movements of each of said slide pins.

14. The apparatus of claim 13, said sensing unit including photo sensors correspondingly mounted at end portions of said slide pins and detecting whether the end portions move forward or backward.

15. The apparatus of claim 13, said sensing unit including contact switches correspondingly mounted at end portions of said slide pins and outputting a signal to said control unit with selective turning-on and turning-off according to whether the end portions move forward or backward.

16. The apparatus of claim 13, said sensing unit including photo sensors correspondingly mounted adjacent to said slide pins and detecting whether said slide pins move forward or backward.

17. The apparatus of claim 13, said sensing unit including contact switches correspondingly mounted adjacent to said slide pins and outputting a signal to said control unit with selective turning-on and turning-off according to whether said slide pins move forward or backward.

18. The apparatus of claim 1, said control unit being mounted on the main body.

19. The apparatus of claim 1, said signal generating unit being mounted on the cassette.

20. The apparatus of claim 1, said size signal corresponding to an electrical signal.

21. An image forming apparatus comprising the apparatus as claimed in claim 1.

22. An apparatus recognizing a size of media, said apparatus comprising:
a first media aligning guide being mounted on a cassette and being movable to a plurality of different positions to align media loaded in the cassette, the cassette being detachably mounted in a main body;
a second media aligning guide being mounted on the cassette and being movable to a plurality of different positions to align the media loaded in the cassette;
a signal generating unit being interlocked with said first and second media aligning guides, said signal generating unit generating a signal code in response to a current position of said first and second media aligning guides;
a switching unit being mounted on the main body, said switching unit switching in response to the generated signal code when the cassette is mounted in the main body; and
a control unit outputting a size signal in response to said switching of said switching unit, said size signal corresponding to a size of the media loaded into the cassette.

23. The apparatus of claim 22, said signal generating unit comprising:
a panel being movably mounted with respect to a wall of the cassette, said panel having a first plurality of signal apertures arranged in a first pattern; and
a region of the wall of the cassette being adjacent to said panel, said region having a second plurality of signal apertures, said second plurality of signal apertures being arranged in a second pattern distinguishable from said first pattern, said first and second pluralities of signal apertures producing said signal code.

24. The apparatus of claim 23, said panel being connected to said first media aligning guide and moving in response to movement of said first media aligning guide.

25. The apparatus of claim 24, said first plurality of signal apertures including at least a first aperture and a second aperture, said second plurality of signal apertures including at least a first aperture and a second aperture, said signal code comprising:
at least said first apertures of said first and second pluralities of signal apertures being aligned with each other and being not blocked and forming a through-hole through the wall of the cassette and through said panel when the cassette is mounted in the main body;
at least said second aperture of said first plurality of signal apertures being blocked by the wall of the cassette when the cassette is mounted in the main body; and
at least said second aperture of said second plurality of signal apertures being blocked by said panel when the cassette is mounted in the main body.

26. The apparatus of claim 25, said switching unit further comprising:
a plurality of slide pins selectively moving forward and backward according to an interference with said signal code generated by said signal generating unit when the cassette is mounted in the main body; and
a sensing unit sensing forward and backward movements of each of said slide pins, at least one of said slide pins penetrating the through-hole formed by said first apertures of said first and second pluralities of signal apertures when the cassette is mounted in the main body.

27. The apparatus of claim 22, said signal generating unit comprising:
a panel being movable with respect to a wall of the cassette, said panel having a first plurality of signal apertures arranged in a first pattern;
a region of the wall of the cassette being adjacent to said panel, said region having a second plurality of signal apertures arranged in a second pattern distinguishable from said first pattern, said first and second pluralities of signal apertures producing said signal code; and
a slide member being movably mounted along the region of the wall of the cassette, and said apparatus further comprising:
a first interlocking unit mutually interlocking said first media aligning guide and said panel, said first interlocking unit moving said panel in response to a moving of said first media aligning guide; and a second interlocking unit mutually interlocking said second media aligning guide and said slide member, said second interlocking unit moving said slide member in response to a moving of said second media aligning guide, said first plurality of apertures together with said second plurality of apertures forming a size pattern in response to said first and second interlocking units moving said panel and said slide member, said formed size pattern corresponding to the size of the media loaded in the cassette.

28. The apparatus of claim 27, said formed size pattern being selected from among a predetermined plurality of different size patterns, said different size patterns corresponding to different sizes of media.

29. The apparatus of claim 27, said formed size pattern being selected from among a plurality of size patterns, said plurality of size patterns corresponding to different sizes of media.

30. The apparatus of claim 29, said first and second pluralities of apertures having a predetermined unit height.

31. The apparatus of claim 30, said first plurality of signal apertures being arranged adjacent to said second plurality of signal apertures to form said plurality of size patterns on a horizontal reference line to have at least more than three units of said unit height from top to bottom.

32. The apparatus of claim 31, said first plurality of signal apertures being arranged to be combined in correspondence with said second plurality of signal apertures.

33. The apparatus of claim 31, said formed size pattern corresponding to selected ones of said first plurality of apertures and selected ones of said second plurality of apertures being closed and opened in response to movement of said first panel and of said slide member.

34. The apparatus of claim 27, said first interlocking unit comprising:
an arm member having a first end and a second end, said arm member being rotatably mounted on bottom of the cassette, said first end being connected with said first media aligning guide, said second end being connected with said panel.

35. The apparatus of claim 27, said second interlocking unit comprising:
a cam protrusion being provided on bottom of said second media aligning guide; and
a rotating member being mounted on bottom of the cassette in a state elastically biased in one direction to be rotated by an interference of said cam protrusion, one end of said rotating member being connected to said slide member to constrain movement of said slide member.

36. The apparatus of claim 22, said first media aligning guide being mounted in connection with a first guide groove formed in the cassette, said first media aligning guide being moved in linear reciprocating movements along said first guide groove.

37. The apparatus of claim 22, said first media aligning guide being reciprocally movable to said plurality of different positions along a first line in a first direction, and said second media aligning guide being reciprocally movable to a plurality of different positions along a second line in a second direction, said first direction being substantially perpendicular to said second direction.

38. The apparatus of claim 22, said second media aligning guide being mounted in connection with a second guide groove formed in the cassette, said second media aligning guide being moved in linear reciprocating movements along said second guide groove.

39. The apparatus of claim 22, said switching unit further comprising:
a plurality of slide pins selectively moving forward and backward according to an interference with said signal code generated by said signal generating unit when the cassette is mounted in the main body; and
a sensing unit sensing forward and backward movements of each of said slide pins.

40. The apparatus of claim 22, said switching unit being movably mounted in the main body, said switching unit moving backward being pressed by the cassette when the cassette is mounted in the main body, said switching unit moving forward being released from the cassette when the cassette is removed from the main body.

41. The apparatus of claim 22, the cassette being detachably mounted in the main body in a first direction, the media being fed from the cassette seriatim in a second direction, said first and second directions being perpendicular to each other.

42. An image forming apparatus comprising the apparatus as claimed in claim 22.

43. An apparatus recognizing a size of media, said apparatus comprising:
a first media aligning guide being mounted on a cassette and being movable to a plurality of different positions to align media loaded in the cassette, the cassette being detachably mounted in a main body;
a second media aligning guide being mounted on the cassette and being movable to a plurality of different positions;
a signal generating unit being interlocked with said first and second media aligning guides, said signal generating unit generating a signal code in response to a current position of said first and second media aligning guides, said signal code having code combinations respectively corresponding to sizes of media;
a switching unit switching in response to the generated signal code when the cassette is mounted in the main body; and
a control unit outputting a size signal in response to said switching of said switching unit, said size signal corresponding to a size of the media loaded into the cassette.

44. The apparatus of claim 43, said signal generating unit comprising:
a panel being movable with respect to a wall of the cassette, said panel having a first plurality of signal apertures arranged in a first pattern, said panel being interlocked with said first media aligning guide and moving in response to movement of said first media aligning guide;
a region of the wall of the cassette having a second plurality of signal apertures arranged in a second pattern distinguishable from said first pattern, said first and second pluralities of signal apertures producing said signal code; and
a slide member being movable along the region of the wall of the cassette, said slide member being interlocked with said second media aligning guide and moving in response to movement of said second media aligning guide, and said apparatus further comprises;
a first interlocking unit mutually interlocking said first media aligning guide and said panel, said first interlocking unit moving said panel in response to a moving of said first media aligning guide; and a second interlocking unit mutually interlocking said second media aligning guide and said slide member, said second interlocking unit moving said slide member in response to a moving of said second media aligning guide, said first plurality of apertures together with said second plurality of apertures forming a size pattern in response to said first and second interlocking units moving said first panel and said slide member, said formed size pattern corresponding to the size of the media loaded in the cassette.

45. The apparatus of claim 44, said slide member selectively opening and closing at least one of said second plurality of signal apertures by linearly reciprocally moving along the region of the wall of the cassette.

46. The apparatus of claim 44, said signal generating unit forming said size pattern and forming at least one size code, said size code being formed by said slide member selectively opening and closing at least one of said second plurality of signal apertures by linearly reciprocally moving along the region of the wall of the cassette, said size pattern being distinguishable from said size code, said size pattern and said size code together corresponding to a size of the media loaded in the cassette.

47. The apparatus of claim 43, said second media aligning guide being movable to said plurality of different positions to align the media loaded in the cassette.

48. An image forming apparatus comprising the apparatus as claimed in claim 43.

49. An apparatus recognizing a size of media, the apparatus comprising:
  a media aligning guide provided to a cassette and movable to a plurality of positions to align media loaded in the cassette; and
  a signal generating unit generating a signal code corresponding to a current position of the media aligning guide and a size of the media loaded into the cassette, wherein: the signal generating unit comprises a pattern output unit having a plurality of signal apertures arranged in a predetermined pattern,
  the signal code is generated according to a current state of the signal apertures, and
  the state of the signal apertures is changeable by a movement of the media aligning guide.

50. The apparatus of claim 49, wherein the pattern output unit is movable by the movement of the media aligning guide; and the signal code is generated according to a current position of the signal apertures.

51. The apparatus of claim 49, wherein:
  the pattern output unit is a region of a wall of the cassette;
  the signal generating unit further comprises:
    an obstructing unit movable by the movement of the media aligning guide;
    the obstructing unit obstructing one or more of the signal apertures according to the movement of the media aligning guide; and
  the signal code is generated according to a current position of the obstructing unit.

52. The apparatus of claim 49, further comprising:
  a switching unit switching in response to the generated code signal where the cassette is mounted to a main body; and
  a control unit outputting a size signal corresponding to the size of the media loaded into the cassette in response to the switching of the switching unit.

53. An image forming apparatus comprising the apparatus as claimed in claim 49.

54. An apparatus recognizing a size of media, the apparatus comprising:
  a first media aligning guide provided to a cassette and movable to a plurality of positions corresponding to different media lengths;
  a second media aligning guide provided to the cassette and movable to a plurality of positions corresponding to different media widths; and
  a signal generating unit associated with the first and second aligning guides to generate a signal code corresponding to a current position of the first and second media aligning guides, wherein:
  the signal code corresponds to a size of media loaded into the cassette, and
  at least one of the first and second media aligning guides is movable to the plurality of positions to align the media loaded in the cassette.

55. The apparatus of claim 54, wherein the signal generating unit comprises: a first signal generating unit associated with the first media aligning guide to generate a first signal code corresponding to the current position of the first media aligning guide; and
  a second signal generating unit associated with the second media aligning guide to generate a second signal code corresponding to the current position of the second media aligning guide, and
  the signal code comprises the first and second signal codes.

56. The apparatus of claim 55, wherein
  the first signal generating unit comprises:
    one or more signal apertures having a predetermined pattern; and
    an obstructing unit, and
  the first signal code is generated according to a result of a position of the one or more signal apertures relative to a position of the obstructing unit, the result being changeable by a movement of the first media aligning guide.

57. The apparatus of claim 56, wherein the obstructing unit is movable by the movement of the first media aligning guide.

58. The apparatus of claim 56, wherein the one or more signal apertures are provided to move by the movement of the first media aligning guide.

59. The apparatus of claim 58, wherein the obstructing unit is formed by a predetermined cut out of a wall of the cassette, and the one or more signal apertures are provided to a panel movable with respect to the predetermined cut out of the wall by the movement of the first media aligning guide.

60. The apparatus of claim 56, wherein:
  the second signal generating unit comprises:
    one or more signal apertures having a predetermined pattern; and
    an obstructing unit, and
  the second signal code is generated according to a result of a position of the one or more signal apertures relative to a position of the obstructing unit, the result being changeable by a movement of the second media aligning guide.

61. The apparatus of claim 60, further comprising:
  a switching unit switching in response to the generated code signal where the cassette is mounted to a main body; and a control unit outputting a size signal corresponding to the size of the media loaded into the cassette in response to the switching of the switching unit.

62. The apparatus of claim 61, wherein switching unit further comprising:
a plurality of slide pins selectively moving forward and backward according to an interference with said signal code generated by said signal generating unit when the cassette is mounted in the main body; and
a sensing unit sensing forward and backward movements of each of said slide pins.

63. The apparatus of claim 56, wherein the obstructing unit obstructs the one or more signal apertures according to the movement of the first media aligning guide.

64. The apparatus of claim 56, wherein the obstructing unit changes the predetermined pattern of the one or more signal apertures by obstructing the one or more signal apertures according to the movement of the first media aligning guide.

65. The apparatus of claim 55, wherein:
the second signal generating unit comprises:
one or more signal apertures having a predetermined pattern; and
an obstructing unit, and
the second signal code is generated according to a result of position of the one or more signal apertures relative to a position of the obstructing unit, the result being changeable by a movement of the second media aligning guide.

66. The apparatus of claim 55, wherein:
the first and/or second signal generating unit comprises a pattern output unit having one or more signal apertures;
the pattern output unit or units being movable by a movement of the corresponding one or ones of the first and second media aligning guides; and
the first and/or second signal code is generated according to a current position of the corresponding one or ones of the one or more signal apertures of the first and/or second signal generating unit.

67. The apparatus of claim 55, wherein:
the first and/or second signal generating unit comprises one or more signal apertures having a predetermined pattern, and an obstructing unit for changing the predetermined pattern of the one or more signal apertures by obstructing the one or more signal apertures according to a movement of the corresponding media aligning guide; and
the obstructing unit or units movable by the movement of the corresponding one or ones of the first and second media aligning guide, and the first and/or second signal code is generated according to a position the corresponding one or ones of the obstructing units.

68. The apparatus of claim 67, further comprising:
a switching unit switching in response to the generated code signal where the cassette is mounted to a main body; and
a control unit outputting a size signal corresponding to the size of the media loaded into the cassette in response to the switching of the switching unit.

69. The apparatus of claim 68, wherein switching unit further comprising:
a plurality of slide pins selectively moving forward and backward according to an interference with said signal code generated by said signal generating unit when the cassette is mounted in the main body; and
a sensing unit sensing forward and backward movements of each of said slide pins.

70. The apparatus of claim 54, further comprising:
a switching unit switching in response to the generated code signal where the cassette is mounted to a main body; and
a control unit outputting a size signal corresponding to the size of the media loaded into the cassette in response to the switching of the switching unit.

71. An image forming apparatus comprising the apparatus as claimed in claim 54.

* * * * *